UNITED STATES PATENT OFFICE.

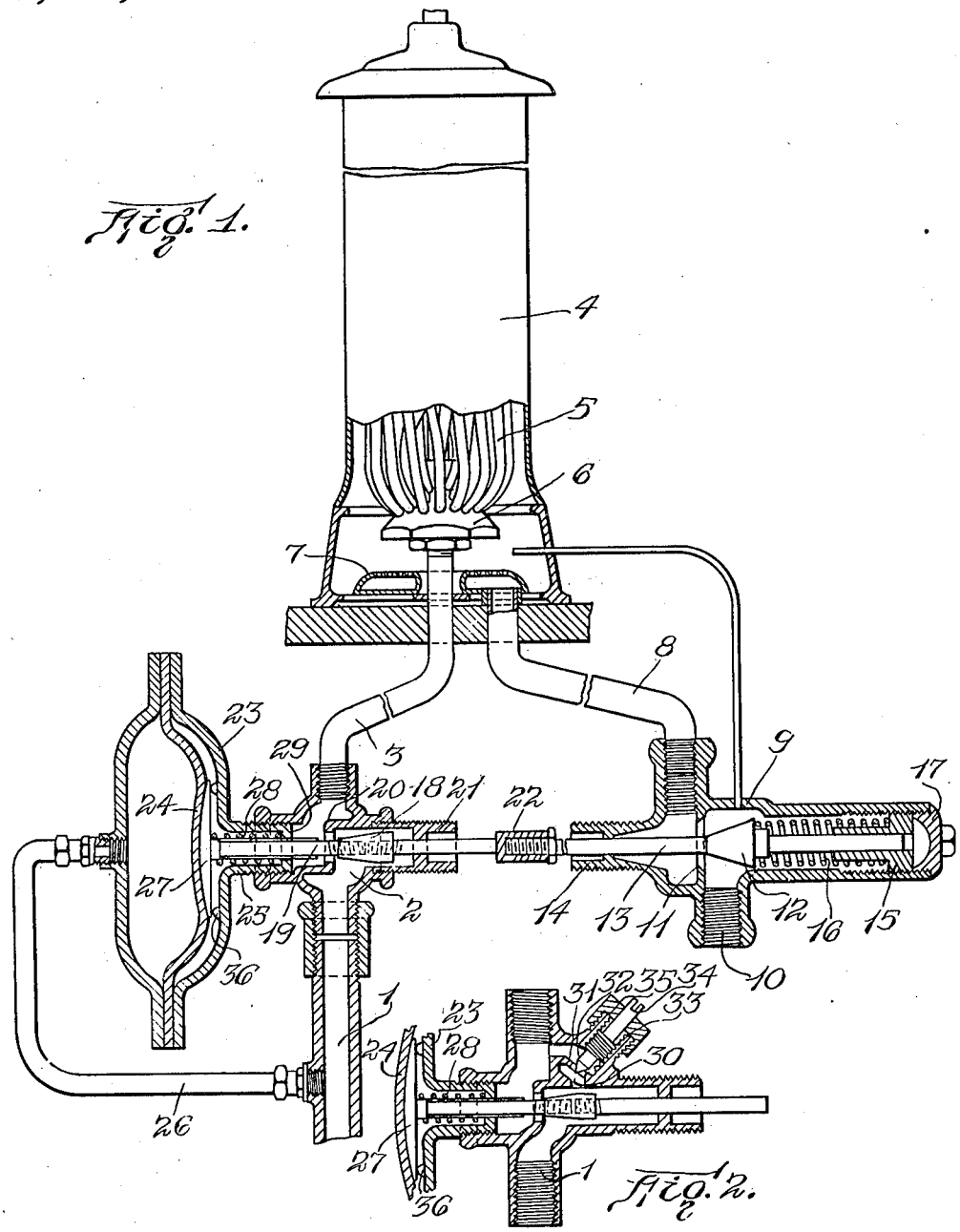

ELMER S. STACK, OF WEST SOMERVILLE, MASSACHUSETTS, ASSIGNOR TO STACK HEATER COMPANY, A CORPORATION OF MASSACHUSETTS.

AUTOMATIC REGULATOR FOR GAS WATER-HEATERS.

1,292,912.　　　　　Specification of Letters Patent.　　Patented Jan. 28, 1919.

Application filed January 20, 1914. Serial No. 813,184.

*To all whom it may concern:*

Be it known that I, ELMER S. STACK, a citizen of the United States, and resident of West Somerville, in the county of Middlesex and State of Massachusetts, have invented certain new and useful Improvements in Automatic Regulators for Gas Water-Heaters, of which the following is a specification.

The present invention relates to an apparatus designed particularly to be used in connection with water heaters in which the heat is furnished by a gas flame or other heating agent, the device being designed and adapted to control the supply of heating agent in proportion to the rate of flow of water through the heater so that the amount of heat furnished will vary in proportion to the quantity of water passing through the heater in a unit of time. The heaters with which my present invention is used are intended and adapted to be installed in any place where it is desirable to produce hot water or to heat any other liquid. The water or other liquid delivered from the heater should be hot enough but not too hot, that is, in an ordinary domestic hot water installation, it need not be at the boiling temperature or very near such temperature. For such purposes it is therefore desirable on the one hand, that enough heat should be developed to raise the temperature of the water to the desired point when the heater is used to its full capacity; and on the other hand, both for the sake of economy in the use of the heating agent and to avoid generation of steam in the heater, that too great a heat should not be developed when a small quantity of water is drawn from the heater or when the heater is idle.

My invention therefore has for one of its objects to provide a controlling device in the nature of an automatic regulator which will, directly or indirectly, supply or generate more heat when the flow of water through the heater is rapid, and will proportionately reduce or entirely shut off the supply of heating agent, respectively, when such flow is reduced or is entirely stopped.

Another object of the invention is to so construct the automatic regulator that the actuating member of such regulator is not in the direct path of the water flowing to the heater, thereby avoiding danger of the regulator being made inoperative by accumulation of sediment and other solid matter carried by the water, or imperfectly operative through sticking and frictional resistance of any part of the regulator.

Still another object is to provide in a regulator having the features above indicated, a means for causing the same to be perfectly automatic and positive for opening the water supply valve and heat controlling valve to an extent proportional to the rate of flow of water through the heater, and preventing the opening of such valves to any greater extent, except in consequence of an increased flow of water. In the accompanying drawings, Figure 1 is a diagrammatic view showing the preferred embodiment of my regulator in section and illustrating the manner in which the same is connected with the heater.

Fig. 2 is a modification of the adjusting means employed in connection with the regulator.

The same reference characters indicate the same parts in all the figures.

In the accompanying drawings, 1 represents a water supply pipe which is connected with a valve casing 2, and 3 represents the pipe leading from the valve casing for conducting water to a heater 4. Such heater may be of any desired character and construction, either one of the heaters in common use, or a special heater. For illustration I have shown the special heater illustrated and described in my Letters Patent of the United States No. 1,125,758 granted January 19, 1915, but this illustration is not to be considered as having any limiting significance in respect to the heater with which my automatic regulator may be used. The heater here shown is equipped with a cluster or series of water tubes 5 branching from a header 6 to which the pipe 3 is connected. It also has a burner 7 at which a gas flame may be produced for heating the water. I desire to state that Fig. 1 which shows the heater is diagrammatic and is not intended to be taken as showing the actual proportions between the heater and the regulator. 8 represents a pipe for conducting gas to the burner 7, and 9 represents a valve casing with which the pipe 8 is connected and in which there is an inlet 10 adapted to be connected with a gas supply pipe. In the valve casing 9 between the inlet and the outlet is an annular wall 11 forming a valve seat with which the valve 12 cooperates. Said valve is mounted upon a stem 13, one end of which passes through a stuffing box 14 at one end of the casing 9, in which it has a bearing, and of which the opposite end is supported in a guide 15 which is externally threaded and is engaged with internal threads in a portion of the casing. A spring 16 abuts against the head of the guide 15 and bears against the valve 12 tending to close the latter. The force exerted by this spring may be adjusted and altered by screwing the guide 15, which is also the fixed abutment for the spring, toward or away from the valve. A removable cap 17 closes the chamber of the valve casing in which said guide and abutment are contained but it may be removed to give access to the same when necessary for adjusting the spring. The valve 12 is preferably conical, or at any rate is tapered gradually from the large end, which is wide enough to fit the seat 11, to the smaller end.

The length of this valve is approximately equal to, or at least as great as, the length of its total movement from closed to wide open position, so that the full movement of the valve is necessary to fully open the passage for the gas, and such passage will vary in effective size according to the position of the valve.

In the valve casing 2 there is a water valve 18 carried by a stem 19. Preferably said valve is screw-threaded on said stem, for the double purpose of adjustment and of convenience in assembling in the casing 2. There is also in the casing a partition 20 having an aperture through which said stem passes. The valve 18 is tapered and its larger end is adapted to fit closely within such aperture so that it will practically close the same against flow of water when in the aperture. The length of the water valve is as great as its total range of movement for the same reason as the corresponding relation between the length and range of movement of the gas valve, already described. One end of the stem 19 passes through a stuffing box 21 on the end of the casing 2 and is arranged approximately in line with the gas valve stem 13, so that it may abut against the same or against an adjustable extension 22 thereof, which is formed as a thimble threaded on the end of the stem 13, and is adapted to be projected or retracted more or less. Thus, when the water valve is opened, it opens the gas valve a corresponding amount.

Connected to and communicating with the water valve casing is a diaphragm chamber 23 which contains a diaphragm 24, crossing the same and dividing its interior into two distinct parts or spaces. One of such parts or spaces is in communication with the outlet side of the valve casing, that is, the side toward the heater, and with the pipe 3, through the connecting nipple 25 of the diaphragm chamber, while the other space of the chamber on the opposite side of the diaphragm is in communication with the water supply pipe 1 by a branch pipe 26. The valve stem 19 passes through the connecting nipple 25 into the diaphragm chamber, and carries a head or plate 27 known in the trade as a "follower", which presses upon, and is pressed upon by, the diaphragm.

A spring 28 is contained in the nipple 25, bears on the follower 27 and abuts against an internal shoulder 29 in the nipple. Preferably, the valve stem is provided with two or more longitudinal ribs which guide the same in the end of the nipple 25, while also permitting the water to flow freely to and from the space in the diaphragm chamber on the heater side of the diaphragm.

The operation of the regulator may now be understood. The diagrammatic views illustrate the position when the valves are wide open and the maximum flow of water is permitted. When there is no flow of water through the heater the water pressures on both sides of the diaphragm are equal, and the diaphragm is placed by the spring 28 in its extreme left hand position; the water valve is placed with its large end in the passageway through the partition 20, and the gas valve is closed by its spring 16. Now if water is drawn from any part of the hot water system, the pressure in the heater and at that side of the water valve which is connected to the heater, is immediately reduced to practically nothing because the valve 18 completely closes the passage through the casing 2, making it so nearly tight that whatever slight leakage may occur is insufficient to produce any back pressure. But as the opposite side of the diaphragm is acted upon over its entire area by the full service pressure in the pipe 1, communicated through the connection 26, a great unbalanced pressure is applied to the diaphragm in the direction for causing it to open the valve 18, against which there is no resistance except that of the spring 28 and stuffing box 21 and, when no lost motion is provided for, of the spring 16 and stuffing box 14, until the valve is opened through movement of the diaphragm under this unbalanced pressure and water is allowed to flow through the heater to replace that drawn from the system. As soon as the valve is opened the other side of the diaphragm is exposed to the water flowing past the valve, connection taking place through the nipple 25, and the pressure acting on the diaphragm to open the valve is then balanced and the opening movement is checked.

Thus, the opening of the valve immediately subjects the diaphragm to a counter pressure and balances the same in any position in which the valve is open far enough to permit passage of as much water as is drawn off. As soon as the demand created by opening a hot water tap exceeds the supply permitted to pass by the valve 18, the pressure on the heater side of the valve is reduced below that on the supply side, the valve opening pressure on the diaphragm exceeds the valve closing pressure, and the valve is opened wider until it reaches the point where the permitted flow is sufficient to meet the demand. When the water is partly or wholly shut off, the hydrostatic pressures acting on both sides of the diaphragm are balanced and the springs 28 and 16 exert an unbalanced pressure which moves the diaphragm and valve in the direction for closing, until a new position of equilibrium is reached. Spring 16 acts until the gas valve is closed and therefore exerts pressure tending to close the water valve 18 until that valve also is nearly or wholly closed, the period during which this spring acts being governed by the amount of lost motion between the spindles of the valves due to the regulation of the adjustable extension 22. This spring may be made comparatively heavy so as to exert an appreciable force against the opening of the valve, and being adjustable as to its force through adjustment of the abutment 15, it affords a means for regulating the counter force which opposes the valve opening pressure exerted by the water on the supply side of the water valve. The spring 28 is merely of sufficient strength to displace the diaphragm and water valve against the inertia of the water, and neither this spring nor the spring 16 has any appreciable effect in making less positive the force under which the valves are opened from their wholly closed positions when the water is turned on.

The force of the foregoing statement may be appreciated by taking for illustration some figures and numerical values which are encountered in practice. Let us assume for this purpose that the pressure under which the water is supplied from the main is fifty pounds per square inch and that the diameter of the diaphragm 24 exposed to this pressure is five inches, the area of such a diaphragm is therefore nearly twenty square inches and the pressure acting upon it tending to open the water valve is therefore nearly one thousand pounds. As the pressure on the heater diaphragm is practically nothing when the hot water faucet is first opened, evidently the springs, which in practice would never exert anything nearly so powerful a force as this, are no material obstacle to the first opening of the valves, but the valves are opened by a powerful unbalanced pressure great enough to overcome any sticking which would be found in practice. Even in cases where the water pressure is much less than that suggested for illustration, it is possible by adjusting the spring 16, or by providing a larger diaphragm, to produce such a disparity between the valve opening pressure and the opposing spring pressure as to insure positive and immediate opening of the valves when the water is drawn. The opposing effect of the spring 16 takes place after the water valve has been partly opened and the diaphragm subjected on the heater side to a back pressure, whereupon the spring plus each back pressure becomes effective to limit the opening of the valves to just the amount required by the demand upon the heater, preventing the valves from being opened too widely and keeping them steady.

From the foregoing explanation, it will be at once apparent that upon drawing water or shutting off the water at any one or more faucets, the water valve immediately assumes a position where it permits just the amount of water to flow past it which is required to supply the amount demanded, and that immediately upon assuming such position, the actuating diaphragm becomes balanced, and the gas valve takes the position in which it permits passage of enough gas and no more to heat the water thus flowing to the required temperature. Evidently, therefore hot water may be drawn in quantities less than the maximum permitted by the capacity of the heater, at exactly the temperature required, and when it is slowly drawn the gas valve is so far shut down that there is no chance of the water being overheated. This exact regulation permits water to be drawn simultaneously from two or more taps, provided the quantity drawn from all the taps is confined within the capacity of the heater, each person thus drawing the water will get the water at the desired temperature and neither will deprive the others of the desired hot water.

Therefore, the valve 18 is never opened more widely than enough to supply the amount of water required, that is, it is not fully opened when only a small quantity is drawn off, or when the rate of drawing water is slow. The gas valve is moved with the water valve, and is opened or closed by approximately equal amounts, hence, the heat of the flame is proportioned according to the amount of water drawn from the heater and according to the rate at which water flows to the same. A flame regulated in exact proportion to the requirements of the heater is thus provided for.

The adjustable member 22 on the end of the gas valve stem is provided so that there may be more or less lost motion between the water valve and the gas valve at the beginning of the opening movements thereof. That is, it is not desirable that the flame at the burner shall be lighted until water has begun to flow as otherwise there would be danger of heating the water already in the pipes too hot and generating steam, so a certain amount of lost motion may be provided for to enable the water valve to be partly opened before its stem engages and moves the stem of the gas valve. It is of course to be understood that a pilot flame will be maintained at all times ready to ignite the gas at the burner when the gas valve is opened after having been closed, so that it is possible to entirely shut off the gas from the main burner and insure re-lighting by the pilot light when again turned on.

An alternative means for permitting flow of water to the heater prior to opening the gas valve is represented in Fig. 2. This figure shows the water valve and its casing. In the casing there is a by-pass 30 crossed by a partition 31 with which a valve 32 is adapted to coöperate.

Such valve is screwed adjustably into a nipple 33 and has a stem 34 passing through a stuffing box 35 into a position where it is accessible. This valve is normally kept partly open so that as soon as water is drawn from the heater, there will be a flow past it before the main valve opens. The flow permitted by this secondary valve, as well as by the first opening of the main valve in the form previously described, is less than sufficient to supply even the smallest practical demand so that opening of the water valve sufficiently to turn on the gas is always assured when enough water is drawn to supply the demand.

It is to be noted that stops 36 are provided on one wall of the diaphragm chamber to arrest the head 27 and provide free passage for the water from the heater side of the water valve to the entire area of the diaphragm. If the head 27 were allowed to close against the chamber wall it would shut off the back pressure from the heater from all but a reduced area of the diaphragm and the apparatus would not work properly. The stops 36, which are preferably integral bosses cast on the inner surface of the chamber wall, are therefore provided to arrest the head 27 before it can move far enough to shut off the water from the heater side of the diaphragm.

The actuating member for both the water valve and the gas valve is the diaphragm 24, which is exposed on both sides to the static pressure of water. It is not in the direct path of the water flowing to the heater but is interposed in a by-pass. Consequently, the water which enters the heater does not flow in contact with it or through the chamber in which it is contained, but the water or at least a part of the water, which acts upon the diaphragm is practically dead and is always the same water, being merely forced in and out of one side of the diaphragm chamber. The condition required to make all of the water which enters the compartments of the diaphragm chamber actually dead water is to have the volumes of the connections with each of these spaces as great as the spaces themselves. It is perfectly feasible in an apparatus of the sort described to make the nipple connection 25 and the branch pipe 26 long enough to have so great volume. However, where the actuating member is a diaphragm as here shown, it is not essential that no fresh water should ever enter the diaphragm chamber because the disposition of the chamber is such that most of the water flowing to the heater passes it without entering it in any event, and in such condition that there is no opportunity for any large quantity of sediment, chips, and so forth to enter. A small quantity of sediment in the bottom of the diaphragm chamber would not interfere with the proper operation of the diaphragm. There is thus no opportunity for scale, sediment or other foreign matter carried by the water to collect so as to interfere with the operation of the actuator, as in the instantaneous water heater regulators now in general use. The diaphragm may be made of as large an area as desirable, and much greater than the area of the valve on which the water acts to oppose opening, wherefore it may be made to work with very slight differences of pressure. It is not subject to corrosion and it offers no frictional or adhesive resistance to movement. Therefore, it is always in condition for operation and may be operated however low the unbalanced pressure of water acting upon it, provided only that such pressure is great enough to overcome the pressure of the springs 16 and 28 and the friction of the valve stems in their stuffing boxes.

In specifying in the foregoing description, that the actuator for the water and gas valves is a diaphragm, I have not intended to limit the invention to the use of a diaphragm only as such actuator, for any other movable member adapted to be acted upon oppositely by pressures on opposite sides of the water valve could be used without departing from the spirit of the invention. I have adopted the diaphragm as such actuator in the present embodiment of the invention because it may be mounted in such way as to prevent leakage absolutely without producing resistance to its motion, and its movable portion is perfectly free to move and does not have the disadvantages to which a piston, for instance is subject.

I have shown the means for generating heat as a burner at which gas is burned, but I desire it to be clearly understood that I do so only for the purpose of illustration and not with the intention of limiting my invention to an apparatus in which gas is burned to develop heat. I might use essentially the same apparatus to control any other sort of heat dominating or controlling valve, to control any other fuel than gas, or any other heating fluid than a combustible fuel. For example, an apparatus in which the heating agent is a previously heated fluid, such as steam could be used with my controlling valve applied to it in essentially the manner hereinbefore described.

The adjustment of the valve 18 on its stem 19 is a valuable feature in that it enables the quantity of water which flows through the heater to be varied with respect to the quantity of gas or other heating agent which flows past the valve 12. Thus under varying conditions of pressures encountered in practice and temperatures to be developed it may be desirable to have the water flow more or less rapidly through the heater without proportionately increasing or reducing the amount of the heating agent supplied, or conversely it might be desirable to provide more or less heating agent for the same flow of water. In either case the result is secured by adjusting the valve 18 lengthwise upon its stem.

From a description of the essential principles of arrangement and operation of my invention, hereinbefore given it will be appreciated that the means by which the supply of heating agent is controlled gives the utmost possible economy in service, as it prevents waste of the heating agent when the amounts of hot water drawn are so small as not to require delivery of a great deal of heat. At the same time the heating agent is supplied in large enough quantities to heat the water to the desired temperature as rapidly as the water can be carried through the heater. The apparatus insures safety also in that it so regulates the heating agent as to prevent the water being overheated when the demand is light, or when there is no demand at all, thereby making impossible the generation of steam in the heater, which might injure either the heater or the pipes to which the hot water is delivered. The regulator controlled by pressures is sufficient in itself to secure these effects, and avoids the necessity for providing a thermostat in addition to insure against generation of steam when the flow from the heater is shut off or is very much reduced.

What I claim and desire to secure by Letters Patent is:—

1. The combination with a heater of a conduit conducting fluid to be heated in said heater, a fluid regulating valve in said conduit, a heat dominating valve for governing the amount of heating agent supplied to the heater, an actuator for simultaneously opening or closing said valves to a greater or less extent, a chamber in which said actuator is contained, and connections between said chamber at opposite sides of the actuator and said conduit at opposite sides of said fluid controlling valve adapted to admit fluid pressure from the supply side of the valve and from the heater side of the valve to the opposite sides of the actuator respectively, said valves being constructed to permit flow past them of different amounts of fluid to be heated and heating agent, respectively, according to their position.

2. A heating regulator for heaters comprising in combination with a conduit for conducting fluid to be heated, a valve in said conduit constructed and arranged to close and open the passageway through the same to different extents according to its position, an actuator for opening and closing said valve exposed on opposite sides to the pressures existing in the conduit at respectively opposite sides of the valve, such pressures being different, and the difference between them being variable according to the position of the valve, and a heat controller operated synchronously with said valve and by said actuator and constructed and arranged to supply a greater or less quantity of heat in proportion to its position and the position of the valve.

3. The combination of a heat controller adapted to furnish a greater or less amount of heat according to its position, a fluid operated actuator for shifting and positioning said heat controller, a conduit for conducting fluid to be heated, means for transmitting the pressure of such fluid from different points in said conduit to act in relatively opposite directions upon said actuator, whereby said actuator is displaced when there is a difference between the pressures at such points, and a means in said conduit between said points operatively connected to be moved by said actuator so as to obstruct more or less the passage in the conduit according to the position of the actuator, and thereby control the difference between the fluid pressures at said points.

4. A heat regulating means for water heaters comprising in combination a gas valve, a water conduit, an actuating diaphragm engaged with said valve for opening the same, a spring acting on said valve tending to close the same, connections leading from different points in the conduit transmitting the fluid pressures therefrom to act on opposite sides of the diaphragm, and an obstruction in the conduit between said points adapted to cause a difference in the pressures existing at said points when water is caused to flow through the conduit and being automatically adjustable with variation in pressure conditions so as to modify said difference according to its adjusted position.

5. A heat regulator for heaters comprising in combination a controller constructed, arranged and operable to vary according to its position the amount of heat furnished to the heater, a conduit for conducting to the heater the fluid which is to be heated, an actuator having operative connections with said heat controller for causing the position of the latter to be shifted, a chamber in which said actuator is contained, fluid pressure transmitting connections between different points in said conduit and said chamber at opposite sides of said actuator, and a movable obstructing device constructed and arranged to restrict more or less, according to its position, the flow through said conduit between the points at which the said pressure-transmitting connections are joined thereto, being automatically adjustable to permit a greater or less flow of the fluid in approximate proportion as the demand for the heated fluid is greater or less, and to cause by its obstructing effect such differences between the fluid pressures acting on opposite sides of said actuator as will effect placement of the heat controller by the actuator in the position to furnish that predetermined quantity of heat which is required for heating the demanded quantity of fluid.

6. A heat regulating means for water heaters comprising in combination a gas valve, a water conduit leading to the heater, an actuator for said valve operatively engaged with the latter to cause the same to be opened and closed according to its position, connections leading from different points in said conduit transmitting the fluid pressures therefrom to act on different sides of said actuator, and a movable obstructing device in said conduit between said points arranged to obstruct the conduit to a greater or less extent according to its position, and being automatically controlled by differences between the pressures at such points to permit greater flow of water through the conduit in response to increased pressure difference resulting from increased withdrawal of heated water, and vice versa, whereby to effect a balance of the pressures acting on different sides of the actuator when the latter is in the position which opens the gas valve sufficiently to cause heating to the predetermined degree of the water so withdrawn.

7. The combination with a fluid heater having an outlet, a conduit conveying fluid to said heater, and a heat controller constructed to cause more or less heat to be furnished to the heater according to its position, of an obstructing device located in said conduit and constructed to obstruct flow of fluid therethrough to a greater or less extent according to its position, a fluid operated actuator, means by which said actuator when moved in one direction shifts both said controller and said device into positions for furnishing more heat and permitting greater flow of the fluid respectively, constantly acting yielding resisting means opposing such movement and tending to move said parts in the opposite manner, and fluid conducting connections arranged to transmit pressure from a point in said conduit at the supply side against the actuator in the aforesaid direction and from a point in the conduit at the heater side of said device against the actuator in the opposite direction; said obstructing device when so shifted by unbalanced fluid pressure acting in one direction on the actuator, in consequence of withdrawal of fluid from the heater, permitting increased fluid pressure to act in the said opposite direction on the actuator, and vice versa, whereby the movement of the actuator in either direction is checked when the heat controller has been positioned to furnish heat in predetermined proportion to the fluid withdrawal.

In testimony whereof I have affixed my signature, in presence of two witnesses.

ELMER S. STACK.

Witnesses:
P. W. PEZZETTI,
HENRY A. RAHN.